United States Patent
Li et al.

(10) Patent No.: US 7,701,690 B1
(45) Date of Patent: Apr. 20, 2010

(54) SYSTEM AND METHOD FOR SUPPRESSING LOAD TRANSIENTS IN RADIO FREQUENCY POWER AMPLIFIER SWITCHING POWER SUPPLIES

(75) Inventors: Yushan Li, Longmont, CO (US); Arthur J. Zirger, Boulder, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 133 days.

(21) Appl. No.: 12/008,843

(22) Filed: Jan. 15, 2008

(51) Int. Cl.
*H01H 47/00* (2006.01)

(52) U.S. Cl. ...................... 361/159; 455/63.1

(58) Field of Classification Search ............... 323/283, 323/281, 276, 277, 266; 455/63.1; 361/159
See application file for complete search history.

(56) References Cited

U.S. PATENT DOCUMENTS

| | | | |
|---|---|---|---|
| 6,046,577 A * | 4/2000 | Rincon-Mora et al. | 323/282 |
| 6,703,813 B1 * | 3/2004 | Vladislav et al. | 323/270 |
| 6,806,690 B2 * | 10/2004 | Xi | 323/273 |
| 6,831,519 B2 | 12/2004 | Bar-David et al. | |
| 7,046,090 B2 | 5/2006 | Veinblat | |
| 7,058,373 B2 | 6/2006 | Grigore | |
| 7,132,891 B1 | 11/2006 | Dening et al. | |
| 7,477,043 B2 * | 1/2009 | Eberlein | 323/270 |

OTHER PUBLICATIONS

Gary Hanington, et al., "High-Efficiency Power Amplifier Using Dynamic Power-Supply Voltage for CDMA Applications", IEEE Transactions on Microwave Theory and Techniques, vol. 47, No. 8, Aug. 1999, pp. 1471-1476.

Gerhard Thiele, et al., "Current-Mode LDO with Active Dropout Optimization", 2005 IEEE, pp. 1203-1208.

Hsuan-I Pan et al., "Asynchronous Nonlinear Power-Tracking Supply for Power Efficient Linear RF PAs", 2006 IEEE, pp. 2531-2535.

Vahid Yousefzadeh et al., "A Digitally Controlled DC/DC Converter for an RF Power Amplifier", IEEE Transactions on Power Electronics, vol. 21, No. 1, Jan. 2006, pp. 164-172.

Biranchinath Sahu et al., "A High-Efficiency Linear RF Power Amplifier with a Power-Tracking Dynamically Adaptive Buck-Boost Supply", IEEE Transactions on Microwave Theory and Techniques, vol. 52, No. 1, Jan. 2004, pp. 112-120.

Mikkel C.W. Hoyerby et al., "Envelope Tracking Power Supply with fully controlled 4th order Output Filter", 2006 IEEE, pp. 993-1000.

(Continued)

*Primary Examiner*—Shawn Riley

(57) ABSTRACT

A system and a method are disclosed for suppressing load transients in radio frequency power amplifier switching power supplies. A power supply control circuit is provided that includes a switcher circuit and a low drop out circuit. Load transients are suppressed by generating a preload control signal that activates an active current source either in the switcher circuit or in the low drop out circuit. The active current source counteracts a decrease in the switcher operating voltage when a load transient is present. Load transients are also suppressed by generating a step control signal that activates a transistor in a feedback resistor divider network in the switcher circuit to increase the switcher operating voltage during a load transient. The preload and step control signals are reset when the load transient has ended.

20 Claims, 9 Drawing Sheets

OTHER PUBLICATIONS

Siamak Abedinpour et al., "Monolithic Supply Modulated RF Power Amplifier and DC-DC Power Converter IC", 2003 IEEE MTT-S Digest, pp. A89-A92.

Jennifer Kitchen et al., "Combined Linear and Δ-Modulated Switched-Mode PA Supply Modulator for Polar Transmitters", 2007 IEEE International Solid-State Circuits Conference, 3 pages.

* cited by examiner

SYSTEM AND METHOD FOR SUPPRESSING LOAD TRANSIENTS IN RADIO FREQUENCY POWER AMPLIFIER SWITCHING POWER SUPPLIES

CROSS-REFERENCE TO RELATED APPLICATION

The present invention is related to an invention described and claimed in a patent application entitled "System and Method for Providing a Dynamically Configured Low Drop Out Regulator With Zero Quiescent Current and Fast Transient Response" filed on the same date of the present patent application and assigned to the assignee of the present patent application as patent application Ser. No. 12/008,852.

TECHNICAL FIELD OF THE INVENTION

The present invention is generally directed to the manufacture of semiconductor circuits and, in particular, to a system and method for suppressing load transients in radio frequency power amplifier switching power supplies.

BACKGROUND OF THE INVENTION

The telecommunications industry continually attempts to improve the transmitter circuitry in wireless communication systems. Power amplifier (PA) circuitry is a major component of a transmitter of a wireless communication device. Power amplifier (PA) circuitry provides the power for transmitting a signal (including data modulated and carried by the signal) so that a base station or a receiver can receive the signal.

Power amplifier (PA) circuitry uses a large amount of power. The power amplifier (PA) module is one of the most power consuming components of a wireless communication device. Therefore it is very desirable to provide power amplifier (PA) circuitry that is power efficient.

One method for improving power amplifier (PA) efficiency is to use a drain/collector modulation technique. In the drain/collector modulation technique a non-linear high efficiency power amplifier can be used (e.g., a class C power amplifier) instead of a linear low efficiency power amplifier (e.g., a class A amplifier). The power control of the power amplifier (PA) circuitry is achieved by adjusting the power amplifier (PA) power supply $V_{CC}$. A high efficiency power supply combined with a high efficiency power amplifier (PA) (with constant bias) would be ideal.

In prior art power amplifier (PA) modules in GSM (Global System for Mobile Communications) telecommunication devices such as RF3110 (manufactured by RFMD) and TQM7M4014 (manufactured by Triquint), the power amplifier (PA) power supply $V_{CC}$ is from a linear regulator or "low drop out" (LDO) circuit. An LDO circuit can have a high efficiency when the value of its output voltage ($V_{CC}$) is near the value of its input voltage ($V_{BATT}$). But an LDO circuit will have a very low efficiency when its output voltage ($V_{CC}$) is very low compared with its input voltage ($V_{BATT}$).

The maximum efficiency for an LDO circuit is the ratio of the output voltage $V_{CC}$ to the input voltage $V_{BATT}$. That is, the maximum efficiency is given by the ratio $V_{CC}/V_{BATT}$. For example, the maximum efficiency for an LDO in a typical GSM handset with an output voltage of nine tenths volts ($V_{CC}$=0.9 volts) and an input voltage of three and six tenths volts ($V_{BATT}$=3.6 volts) is twenty five percent (25%).

FIG. 1 illustrates a schematic diagram of a first prior art power supply control circuit 100. Power supply control circuit 100 comprises a low drop out (LDO) circuit 110. Low drop out (LDO) circuit 110 comprises an operational amplifier 120 that receives a $V_{RAMP}$ signal on its inverting input. A feedback voltage signal $V_{FB}$ is provided to the non-inverting input of operational amplifier 120. The operating voltage for low drop out (LDO) circuit 110 is provided by a voltage source $V_{BATT}$.

The output of operational amplifier 120 is provided to a gate of a PMOS transistor 140. The source of PMOS transistor 140 is coupled to the operating voltage $V_{BATT}$. The drain of PMOS transistor 140 is coupled to a first end of a first resistor 150. The second end of first resistor 150 is coupled to a first end of a second resistor 160. The second end of second resistor 160 is coupled to ground. The feedback voltage signal $V_{FB}$ is obtained from a node between the first resistor 150 and the second resistor 160.

The output of low drop out (LDO) circuit 110 is the power supply voltage $V_{CC}$. A capacitor 170 is coupled between the output of the low drop out (LDO) circuit and ground. The power supply voltage $V_{CC}$ is provided to radio frequency (RF) power amplifier (PA) 130. Radio frequency (RF) power amplifier (PA) 130 amplifies an RF input signal ($RF_{IN}$) to generate an amplified RF output signal ($RF_{OUT}$).

One method for increasing the efficiency of the power amplifier (PA) power supply $V_{CC}$ is to use a switching regulator. A switching regulator is able to adjust the value of the operating voltage (designated $V_{SWITCHER}$) that is provided to a low drop out circuit. FIG. 2 illustrates a schematic diagram of a second prior art power supply control circuit 200 that comprises a switching regulator 210 (designated "switcher 210"). Switcher 210 has a first input that receives a peak value of voltage (designated $V_{PEAK}$) and a second input that receives an enable signal (designated $EN_{SWITCHER}$).

The low drop out circuit 110 in FIG. 2 has the same structure as the low drop out circuit 110 shown in FIG. 1. However, the operation of the low drop out circuit 110 in FIG. 2 no longer has a single value of operating voltage $V_{BATT}$. Instead, switcher 210 provides a wide dynamic range of operating voltages $V_{SWITCHER}$ to the low drop out circuit 110. For example, the value of the operating voltage $V_{SWITCHER}$ may be chosen in a range from about four hundred millivolts (400 mV) to about four and eight tenths volts (4.8 V).

FIG. 3 illustrates a schematic diagram of a third prior art power supply control circuit 300. Power supply control circuit 300 comprises a switching regulator 304 (designated "switcher 304") and a low drop out (LDO) circuit 306. As shown in FIG. 3, switcher 304 low drop out (LDO) circuit 306 both receive the $V_{RAMP}$ voltage. Both switcher 304 and low drop out (LDO) circuit 306 also receive a $V_{BATT}$ voltage. In addition, the low drop out (LDO) circuit 306 receives a transmit enable signal (designated "TX_EN"). When the transmit enable signal TX_EN is high, the low drop out (LDO) circuit 306 sends the power supply $V_{CC}$ to the power amplifier 302.

In the power supply control circuit 300 of FIG. 3 the output of the switcher 304 (designated "$V_{SWITCHER}$") is set to a direct current (DC) level that represents the peak level of $V_{CC}$ by the control signal $V_{PEAK}$. A typical value for the $V_{SWITCHER}$ voltage for a GSM full power condition may be four and nine tenths volts (4.9 V). A typical value for the $V_{PEAK}$ voltage for a GSM full power condition may be one and six tenths volts (1.6 V) for a steady state operation. The wide bandwidth low drop out (LDO) circuit 306 is used for polar modulation envelope tracking and for providing a fast response to the reference control signal $V_{RAMP}$.

FIG. 4 illustrates the timing waveforms 400 that would be expected for a low drop out (LDO) circuit 306 in a GSM (Global System for Mobile Communications) telecommunication device in which there are no load transient effects. FIG. 5 illustrates the timing waveforms 500 that occur when load transient effects are present.

As shown in FIG. 4 and in FIG. 5, the switcher enable signal $EN_{SWITCHER}$ is turned on in advance of the transmit enable signal TX_EN so that the value of the $V_{SWITCHER}$ signal has settled at its high value before the transmit enable signal TX_EN causes the low drop out (LDO) circuit 306 to send the power supply $V_{CC}$ to the power amplifier 302. The value of the $V_{RAMP}$ signal usually ramps up very quickly. For example, it may increase from a zero value to a maximum value in approximately five microseconds (5 μsec). This will cause the switcher load to go from a no load condition of zero milliamperes (0 mA) to a maximum load condition of approximately two amperes (2 A).

As shown in FIG. 5, this will cause a significant load transient in the $V_{SWITCHER}$ signal. The value of the $V_{SWITCHER}$ signal may temporarily decrease or "dip" as much as two hundred millivolts (200 mV). The time of the decrease is designated in FIG. 5 as $T_{TRAN}$. The $T_{TRAN}$ value represents the time duration of the load transient. Because of the load transient the $V_{CC}$ signal will not be able to follow the $V_{RAMP}$ signal until the $V_{SWITCHER}$ value settles again after the end of the load transient. This is because the $V_{CC}$ signal is not able to follow the scaled $V_{RAMP}$ signal during the load transient because the $V_{SWITCHER}$ signal is less than the desired peak level scaled $V_{PEAK}$ during the load transient.

There is also an overshoot on the $V_{SWITCHER}$ value when the power amplifier 302 turns off. This is of no concern, however, because the low drop out (LDO) circuit 306 will force $V_{CC}$ to follow $V_{RAMP}$ as long as $V_{SWITCHER}$ has enough headroom.

Therefore, there is a need in the art for a system and method that is capable of providing a remedy for these prior art deficiencies. In particular, there is a need in the art for a system and method that is capable of providing an improved architecture for a power supply control circuit and a low drop out (LDO) circuit that suppresses load transients that are created by a radio frequency (RF) power amplifier (PA) turning on from an off state.

SUMMARY OF THE INVENTION

To address the above-discussed deficiencies of the prior art, it is a primary object of the present invention to provide a system and method for providing an improved power supply control circuit that is capable of efficiently and correctly suppressing load transients in radio frequency power amplifier switching power supplies.

One advantageous embodiment of the power supply control circuit of the invention comprises a preload control signal circuit that generates a preload control signal. Load transients are suppressed by using the preload control signal to activate an active current source that counteracts a decrease in the switcher operating voltage when a load transient is present.

Another advantageous embodiment of the power supply control circuit of the invention comprises a step control signal circuit that generates a step control signal. Load transients are also suppressed by using the step control signal to activate a transistor in a feedback resistor divider network in the switcher circuit to increase the switcher operating voltage when a load transient is present. The power supply control circuit of the invention resets the preload control signal and resets the step control signal after each load transient has ended.

It is an object of the present invention to provide a system and method for providing an improved power supply control circuit that remedies deficiencies that are present in prior art power supply control circuits.

It is also an object of the present invention to provide a system and method for providing an improved power supply control circuit that can efficiently and correctly suppress a load transient in a switcher operating voltage.

It is yet another object of the present invention to provide a system and method for an improved power supply control circuit that comprises a preload control signal circuit that generates a preload control signal that activates an active current source in the power control circuit to counteract and suppress a load transient in a switcher operating voltage.

It is also another object of the present invention to provide a system and method for an improved power supply control circuit that comprises a step control signal circuit that generates a step control signal that activates a transistor in a feedback resistor divider network in a switcher circuit to increase a switcher operating voltage when a load transient is present.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
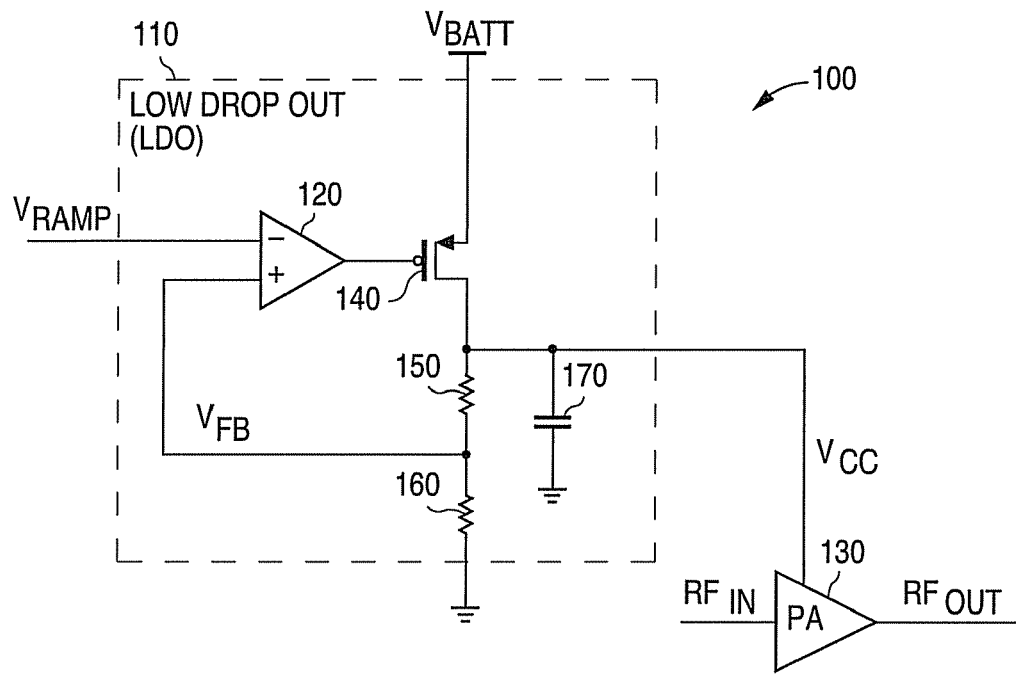
FIG. 1 illustrates a schematic diagram of a first prior art power supply control circuit.
Figure 2:
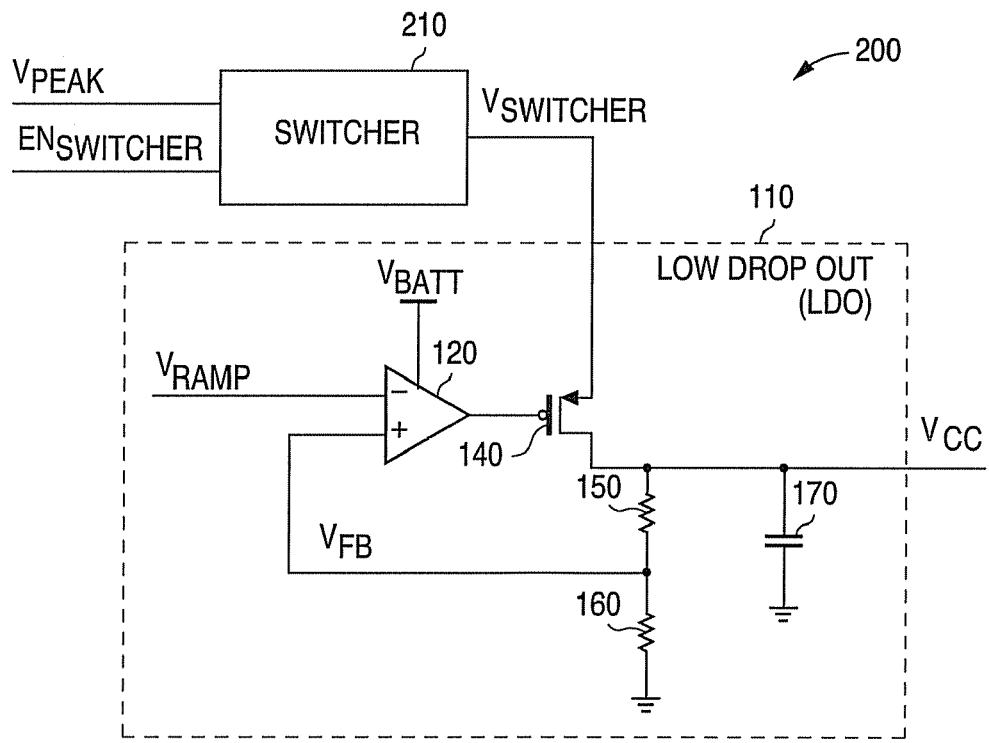
FIG. 2 illustrates a schematic diagram of a second prior art power supply control circuit.
Figure 3:
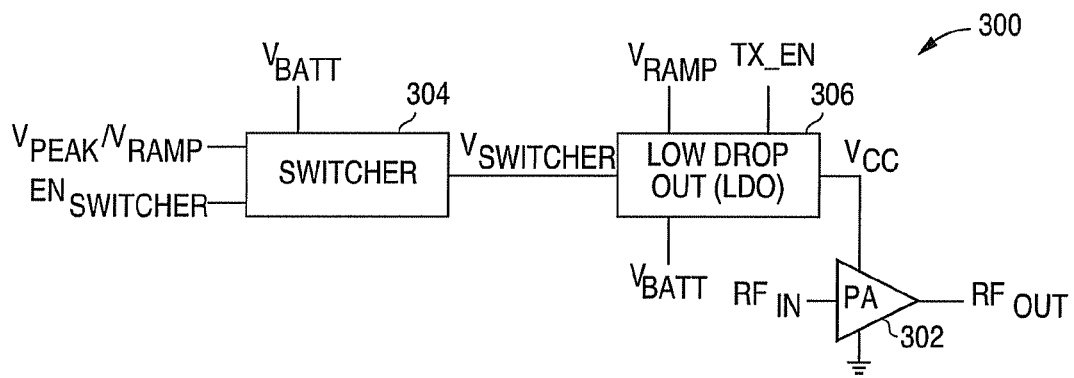
FIG. 3 illustrates a schematic diagram of a third prior art power supply control circuit.
Figure 4:
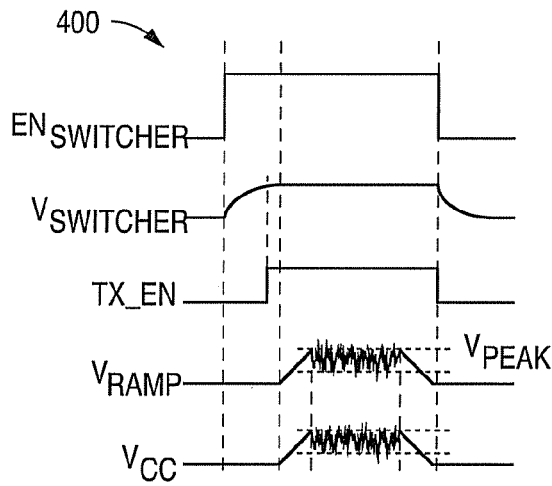
FIG. 4 illustrates timing waveforms that would be expected in a power supply control circuit and a low drop out circuit in which there are no load transient effects.
Figure 5:
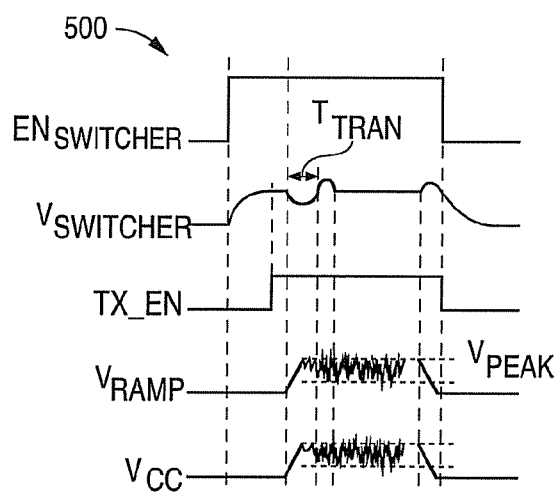
FIG. 5 illustrates timing waveforms that occur in a power supply control circuit and in a low drop out circuit in which load transient effects are present.

FIGS. 1 through 16 and the various embodiments used to describe the principles of the present invention in this patent document are by way of illustration only and should not be construed in any way to limit the scope of the invention. Those skilled in the art will understand that the principles of the present invention may be implemented in any type of suitably arranged power amplifier circuit.

To simplify the drawings the reference numerals from previous drawings will sometimes not be repeated for structures that have already been identified.

The present invention presents two approaches to the problem of suppressing load transient voltages in radio frequency power amplifier switching power supplies. The first approach preloads the switcher circuit with an active current source to counteract the decrease in switcher voltage during the time that the load transient is present. This reduces the load step size and decreases the size of the load transient voltage dip.

The second approach temporarily increases the value of the switcher voltage $V_{SWITCHER}$ to accommodate the anticipated load transient voltage dip. This provides enough headroom for the low drop out (LDO) circuit for the $V_{CC}$ voltage to follow the $V_{RAMP}$ voltage. The value of the switcher voltage $V_{SWITCHER}$ is reset to its normal level after the load transient voltage dip has ended.

The present invention combines these two approaches to the problem of suppressing load transient voltages. Each of the two approaches has its own limitations. For example, there is a process limitation concerning how high the value of the switcher voltage $V_{SWITCHER}$ can be set. The process limitation is the maximum operation voltage of the device.

There is also a limitation in the value of the maximum active current that can be preloaded because the heat that is generated by the power of the active load current is dissipated on the active current device. If the temperature rises too high due to the heat, then the device may permanently break down. The active current preload has to be from a large device so that the device can take the amount of power and heat that is generated.

As will be more fully described in detail, a first advantageous embodiment of a power supply control circuit of the present invention comprises (1) a buck/boost switcher circuit and (2) a low drop out (LDO) circuit constructed in accordance with the principles of the present invention. The first advantageous embodiment of the power supply control circuit is illustrated in FIGS. 6, 7, 8 and 9.

The power supply control circuit of the present invention generates two control signals. The first control signal is designated as a "preload" signal and the second control signal is designated as a "step" signal. As will be more fully described, (1) the preload signal is used to activate the internal active current source and (2) the step signal is used to increase the value of the switcher voltage $V_{SWITCHER}$ until after the load transient voltage dip has ended.

Figure 6:
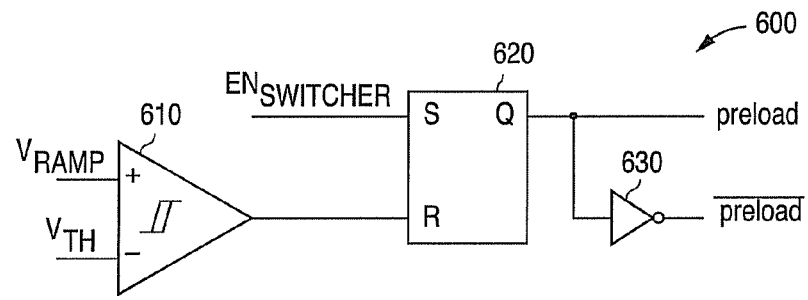
FIG. 6 illustrates a schematic diagram of an advantageous embodiment of a first control circuit that generates a preload control signal of the present invention.

FIG. 6 illustrates an advantageous embodiment of a first control signal circuit 600 that generates a preload control signal. The first control signal circuit 600 comprises a comparator 610, a Set-Reset (S-R) flip-flop 620 and an inverter 630. The non-inverting input of the comparator 610 receives the $V_{RAMP}$ signal and the inverting input of the comparator 610 receives a threshold voltage signal $V_{TH}$. A typical value for the threshold voltage signal $V_{TH}$ is two hundred millivolts (200 mV) or, equivalently, two tenths of a volt (0.2 V). When the value of the $V_{RAMP}$ signal increases beyond the value of the threshold signal $V_{TH}$ then the output of the comparator 610 sends a signal that resets the S-R flip-flop 610.

As shown in FIG. 6, the S input of the S-R flip-flop 610 is connected to the switcher enable signal $EN_{SWITCHER}$ and the output Q of the S-R flip-flop 610 provides the preload signal. The preload signal is high when the switcher enable signal $EN_{SWITCHER}$ is high and remains high until the power amplifier (PA) load appears. The appearance of the power amplifier (PA) load is determined by the comparator 610 comparing the $V_{RAMP}$ signal with the threshold voltage signal $V_{TH}$. The presence of the power amplifier (PA) load is assumed when the value of the $V_{RAMP}$ signal reaches the threshold voltage signal $V_{TH}$ value of about two tenths of a volt (0.2 V). As previously mentioned, the comparator 610 sends a signal that resets the S-R flip-flop 610 so that the preload signal goes low when the $V_{RAMP}$ signal is greater than the threshold voltage signal $V_{TH}$. Lastly, the inverter circuit 630 provides an inverted value of the preload signal (designated as the "preload bar" signal).

Figure 7:
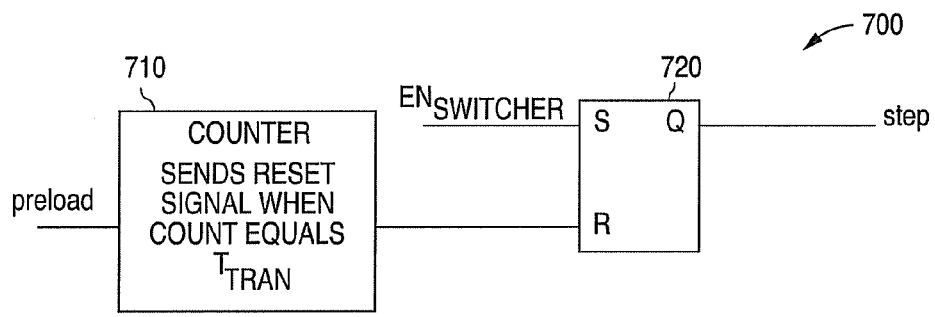
FIG. 7 illustrates a schematic diagram of an advantageous embodiment of a second control circuit that generates a step control signal of the present invention.

FIG. 7 illustrates an advantageous embodiment of a second control signal circuit 700 that generates a step control signal. The second control signal circuit 700 comprises a counter 710, a Set-Reset (S-R) flip-flop 720. The S input of the S-R flip-flop 720 is connected to the switcher enable signal $EN_{SWITCHER}$ and the output Q of the S-R flip-flop 720 provides the step signal. The step signal is high when the switcher enable signal $EN_{SWITCHER}$ is high and remains high until the counter 710 sends a reset signal to the S-R flip flop 720.

The output of the counter 710 is connected to the R input (the reset input) of the S-R flip-flop 720. The preload signal is provided as an input to the counter 710. When the preload signal is high (i.e., equal to one) the counter 710 is in a reset condition and is not counting. When the preload signal goes low (i.e., becomes equal to zero) the counter 710 starting counting. The counter 710 continues to count while the load transient is occurring (i.e., during the time $T_{TRAN}$). When the time period $T_{TRAN}$ ends, then the counter 710 will generate a pulse signal that resets the S-R flip-flop 720. The S-R flip-flop 720 will then cause the step signal to go low (i.e., become equal to zero).

Figure 8:
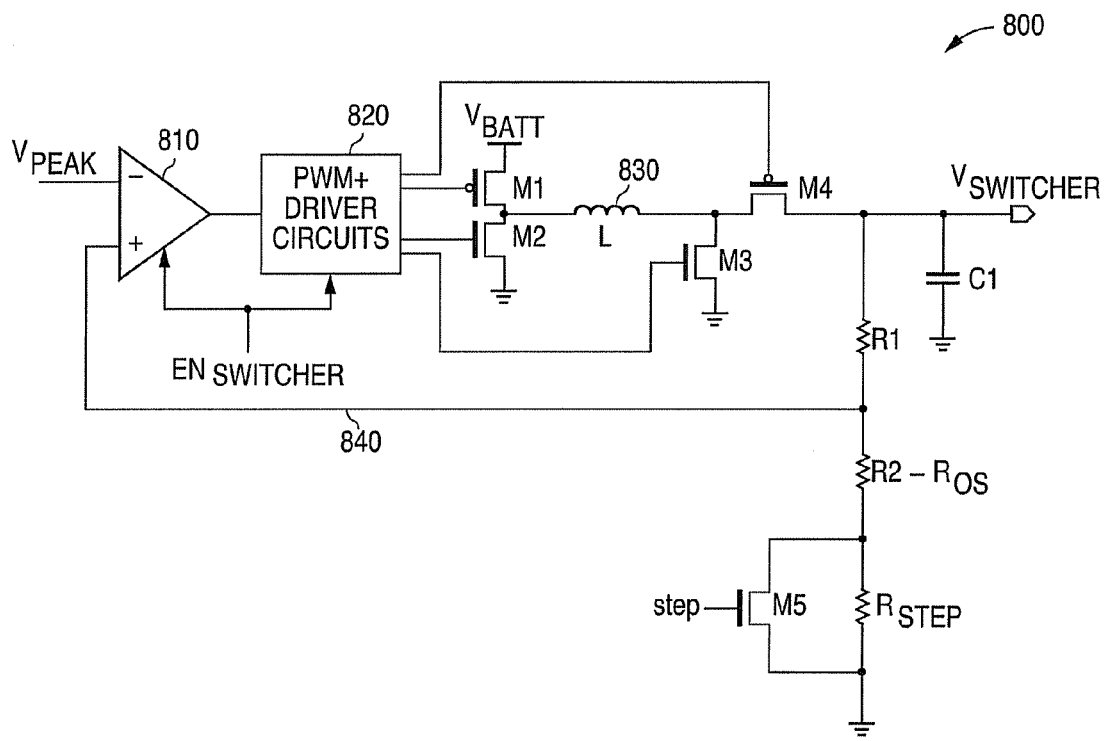
FIG. 8 illustrates a schematic diagram of a first embodiment of a switcher circuit in accordance with the principles of the present invention.

The use of the first control signal (the preload signal) and the second control signal (the step signal) will be more fully described with reference to the circuitry that is shown in FIG. 8 and in FIG. 9.

FIG. 8 illustrates a schematic diagram of a first embodiment of a switcher circuit 800 constructed in accordance with the principles of the present invention. FIG. 9 illustrates a schematic diagram of a first embodiment of a low drop out (LDO) circuit 900 constructed in accordance with the principles of the present invention. The output of the switcher circuit 800 is the voltage that appears at the output node that is designated $V_{SWITCHER}$. The $V_{SWITCHER}$ voltage is provided as an input to the low drop out (LDO) circuit 900. The output of the low drop out (LDO) circuit 900 is the voltage that appears at the output node that is designated $V_{CC}$. The output voltage $V_{CC}$ is provided to a power amplifier (PA) that is not shown in FIG. 9.

The switcher circuit 800 comprises a buck-boost switcher circuit that comprises an error amplifier 810 and pulse width modulation (PWM) circuits and driver circuits 820. The inverting input of the error amplifier 810 receives the $V_{PEAK}$ voltage signal and the non-inverting input of the error amplifier 810 receives a feedback voltage signal. The output of the error amplifier 810 is provided as an input to the PWM and driver circuits 820. As shown in FIG. 8, the enable switcher signal $EN_{SWITCHER}$ is provided to control the operation of the error amplifier 810 and the PWM and driver circuits 820.

A first output line from the PWM and driver circuits 820 controls the operation of a first P-type metal oxide semiconductor (PMOS) transistor M1. A second output line from the PWM and driver circuits 820 controls the operation of a first N-type metal oxide semiconductor (NMOS) transistor M2. A third output line from the PWM and driver circuits 820 controls the operation of a second N-type metal oxide semiconductor (NMOS) transistor M3. A fourth output line from the PWM and driver circuits 820 controls the operation of a second P-type metal oxide semiconductor (PMOS) transistor M4.

The PMOS transistor M1 and the NMOS transistor M2 are connected together as shown in FIG. 8 and are connected to a first end of inductor 830. Power is supplied to the PMOS transistor M1 and to the NMOS transistor M2 by the battery voltage $V_{BATT}$. A typical value of battery voltage is three and six tenths volts (3.6 V). The NMOS transistor M3 and the PMOS transistor M4 are connected together as shown in FIG. 8 and are connected to a second end of inductor 830.

A first end of a first feedback resistor R1 is connected to a node that is located between the PMOS transistor M4 and the $V_{SWITCHER}$ output node. A first end of an output capacitor C1 is connected to a node that is located between the first feedback resistor R1 node and the $V_{SWITCHER}$ output node. A second end of output capacitor C1 is connected to ground.

A second end of the first feedback resistor R1 is connected to a first end of a second feedback resistor that is designated $R2-R_{OS}$. A feedback line 840 connects the node between the first feedback resistor R1 and the second feedback resistor $R2-R_{OS}$ with the non-inverting input of the error amplifier 810.

A second end of the second feedback resistor $R2-R_{OS}$ is connected to a first end of a step resistor that is designated $R_{STEP}$. The second end of the step resistor $R_{STEP}$ is connected to ground. A third N-type metal oxide semiconductor (NMOS) transistor M5 is connected in parallel with the step resistor $R_{STEP}$. The gate of the NMOS transistor M5 is controlled by the step control signal. NMOS transistor M5 may also be referred to as step transistor M5.

A typical value of resistance for the first feedback resistor R1 is two hundred thousand ohms (200 kΩ). A typical value of resistance for a second feedback resistor R2 is one hundred thousand ohms (100 kΩ) and a typical value of resistance for an offset resistor ($R_{OS}$) is nine thousand ohms (9 kΩ). Therefore, a typical value of resistance for the second feedback resistor $R2-R_{OS}$ is ninety one thousand ohms (91 kΩ). A typical value of resistance for the step resistor $R_{STEP}$ is six thousand ohms (6 kΩ).

Figure 9:
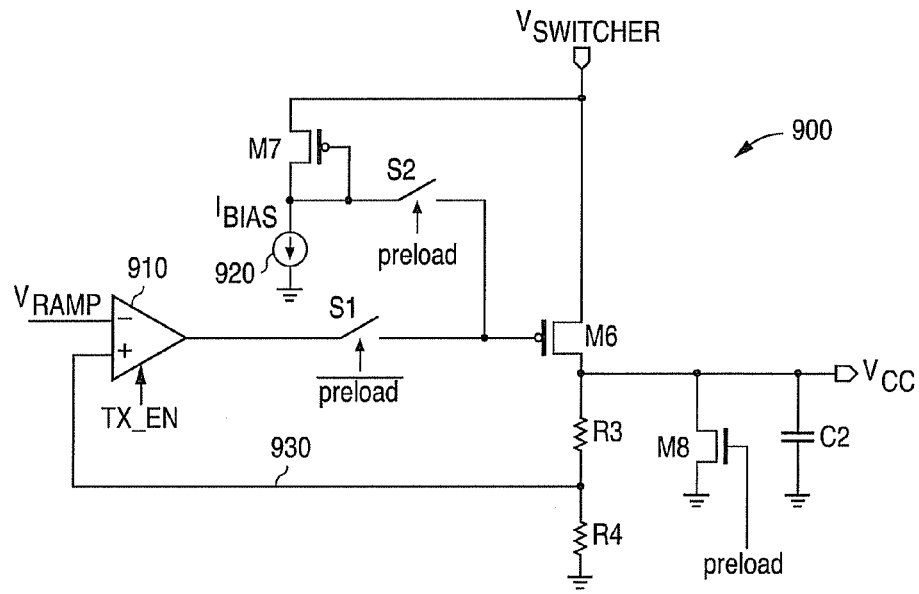
FIG. 9 illustrates a schematic diagram of a first embodiment of a low drop out (LDO) circuit in accordance with the principles of the present invention.

As previously mentioned, FIG. 9 illustrates a schematic diagram of a first embodiment of a low drop out (LDO) circuit 900 of the invention. Low drop out (LDO) circuit 900 comprises an error amplifier 910 and a current source 920 (designated $I_{BIAS}$ 920). The inverting input of the error amplifier 910 receives the $V_{RAMP}$ voltage signal and the non-inverting input of the error amplifier 910 receives a feedback voltage signal. The output of the error amplifier 910 is provided as an input to the gate of a third P-type metal oxide semiconductor (PMOS) transistor M6. As shown in FIG. 9, the transmit enable signal TX_EN is provided to control the operation of the error amplifier 910.

A first switch circuit (designated S1) is located in the signal line between the output of the error amplifier 910 and the gate of the PMOS transistor M6. The switch S1 is controlled by the preload bar signal. That is, when the preload bar signal is high (and the preload signal is low), then the switch S1 will be closed.

The source of PMOS transistor M6 is connected to the $V_{SWITCHER}$ voltage that is provided as an input to the low drop out (LDO) circuit 900. The drain of the PMOS transistor M6 is connected to the output voltage node $V_{CC}$. The drain of the PMOS transistor M6 is also connected to a first end of a third feedback resistor R3. A first end of an output capacitor C2 is connected to the $V_{CC}$ output node. A second end of output capacitor C2 is connected to ground.

A second end of the third feedback resistor R3 is connected to a first end of a fourth feedback resistor that is designated R4. A feedback line 930 connects the node between the third feedback resistor R3 and the fourth feedback resistor R4 with the non-inverting input of the error amplifier 910.

The low drop out (LDO) circuit 900 also comprises a fourth P-type metal oxide semiconductor (PMOS) transistor M7 that has a source that is connected to the $V_{SWITCHER}$ voltage and that has a drain that is connected to a first end of the $I_{BIAS}$ current source 920. A second end of the $I_{BIAS}$ current source 920 is connected to ground. A typical value of current for the $I_{BIAS}$ current source 920 is ten microamperes (10 μA).

The drain and the gate of the PMOS transistor M7 are connected to a first end of a second switch circuit (designated S2). The second end of the switch S2 is connected between the first switch S1 and the gate of the PMOS transistor M6.

The switch S2 is controlled by the preload signal. That is, when the preload signal is high, then the switch S2 will be closed.

Lastly, the low drop out (LDO) circuit 900 comprises a fourth N-type metal oxide semiconductor (NMOS) transistor M8 that has a source that is connected to the output voltage $V_{CC}$ and that has a drain that is connected to ground. As shown in FIG. 9, the gate of the NMOS transistor M8 is connected to the preload signal. The preload signal controls the operation of NMOS transistor M8.

In the steady state operation of the power supply control circuit of the present invention the value of the $V_{SWITCHER}$ is set slightly higher than the value of the targeted output voltage value $V_{CC}$ in order to accommodate the low drop out (LDO) voltage. The offset voltage is defined as the difference between the $V_{SWITCHER}$ voltage and the output voltage $V_{CC}$. That is, the offset voltage is equal to the $V_{SWITCHER}$ voltage minus the output voltage $V_{CC}$. The offset voltage may also be referred to as the $V_{SWITCHER}$ overhead voltage.

The presence of an offset resistor $R_{OS}$ reflects the necessity for elevating the $V_{SWITCHER}$ voltage above the $V_{CC}$ voltage in order to provide the $V_{SWITCHER}$ overhead voltage. This can be accomplished by reducing the magnitude of the resistance between node 840 and ground. If the combined resistance (R2 plus $R_{STEP}$) would program the $V_{SWITCHER}$ voltage to be the same as the $V_{CC}$ voltage, then it is expected that replacing the R2 resistor with a resistance value of (R2 minus $R_{OS}$) will program the $V_{SWITCHER}$ voltage to be a voltage that is equal to ($V_{CC}$ voltage plus $V_{SWITCHER}$ overhead voltage). That is why a resistance value of R2−$R_{OS}$ is used between the node 840 and the step resistor $R_{STEP}$ in FIG. 8.

As previously mentioned, the preload signal is used to activate the internal active current source. The preload signal goes high when the switcher enable signal $EN_{SWITCHER}$ goes high and remains high until the power amplifier (PA) load appears. When the preload signal is high, the preload signal closes switch S2 and opens switch S1. This activates the active current source through the third PMOS transistor M6. When the preload signal is high, the preload signal on the gate of the fourth NMOS transistor M8 causes the output voltage $V_{CC}$ to be set to ground.

The PMOS transistor M6 current source then acts as the load for the switcher circuit 800. The power that is dissipated in the PMOS transistor M6 is the product of the $V_{SWITCHER}$ voltage and the current level of the active current source. The reason that the PMOS transistor M6 is chosen as the device to dissipate the power is because the PMOS transistor M6 is usually a large device.

The NMOS transistor M8 that is used to set the output voltage $V_{CC}$ to ground also has a relatively large area but one that is much smaller than the area of the PMOS transistor M6. This is because the NMOS transistor M8 has a smaller voltage drop across its source and drain.

The preloaded active current source on the output voltage $V_{CC}$ may set to one half of the full load $V_{CC}$ current. For example, if the full load $V_{CC}$ current is eight hundred milliamperes (800 mA), then the preloaded active current source may be four hundred milliamperes (400 mA). In such a case, the current mirror ratio would be forty thousand (40,000) because the $I_{BIAS}$ current source 920 provides ten microamperes (10 μA). Four hundred milliamperes (400 mA) is forty thousand times (40,000) larger than ten microamperes (10 μA).

As shown in FIG. 8, the step control signal is used to raise the $V_{SWITCHER}$ voltage via the feedback resistor divider network and keep the $V_{SWITCHER}$ voltage at an elevated level until the load transient has ended (after the time period $T_{TRAN}$ has elapsed). The step signal goes high when the switcher enable signal $EN_{SWITCHER}$ goes high and remains high until the counter 710 determines that the time period $R_{TRAN}$ has elapsed. The step control signal from S-R flip-flop 720 will be reset to a low level by the counter 710 after the time period $T_{TRAN}$ has elapsed. The time period $T_{TRAN}$ represents the worst case for the duration of the load transient. The value of the worst case time period $T_{TRAN}$ can be empirically determined from bench testing.

As previously mentioned, the counter 710 starts counting when the preload signal goes low (i.e., becomes equal to zero) at the beginning of the load transient. As previously described with reference to the first control signal circuit 600, the preload signal goes low when the value of the $V_{RAMP}$ signal increases beyond the value of the threshold signal $V_{TH}$. Alternatively, the counter 710 may be set to start counting when the transmit enable signal TX_EN goes high. The TX_EN signal goes high to send the output voltage $V_{CC}$ to the power amplifier (PA).

When the step control signal is high, the step control signal activates the third NMOS transistor M5 in switcher circuit 800. This sets the value of the $V_{SWITCHER}$ voltage to a higher level to accommodate the anticipated load transient dip in the $V_{SWITCHER}$ voltage that is due to the power amplifier (PA) load. The appropriate value of the $V_{SWITCHER}$ overhead voltage may be empirically determined by bench testing to represent the load transient voltage dip.

Figure 10:
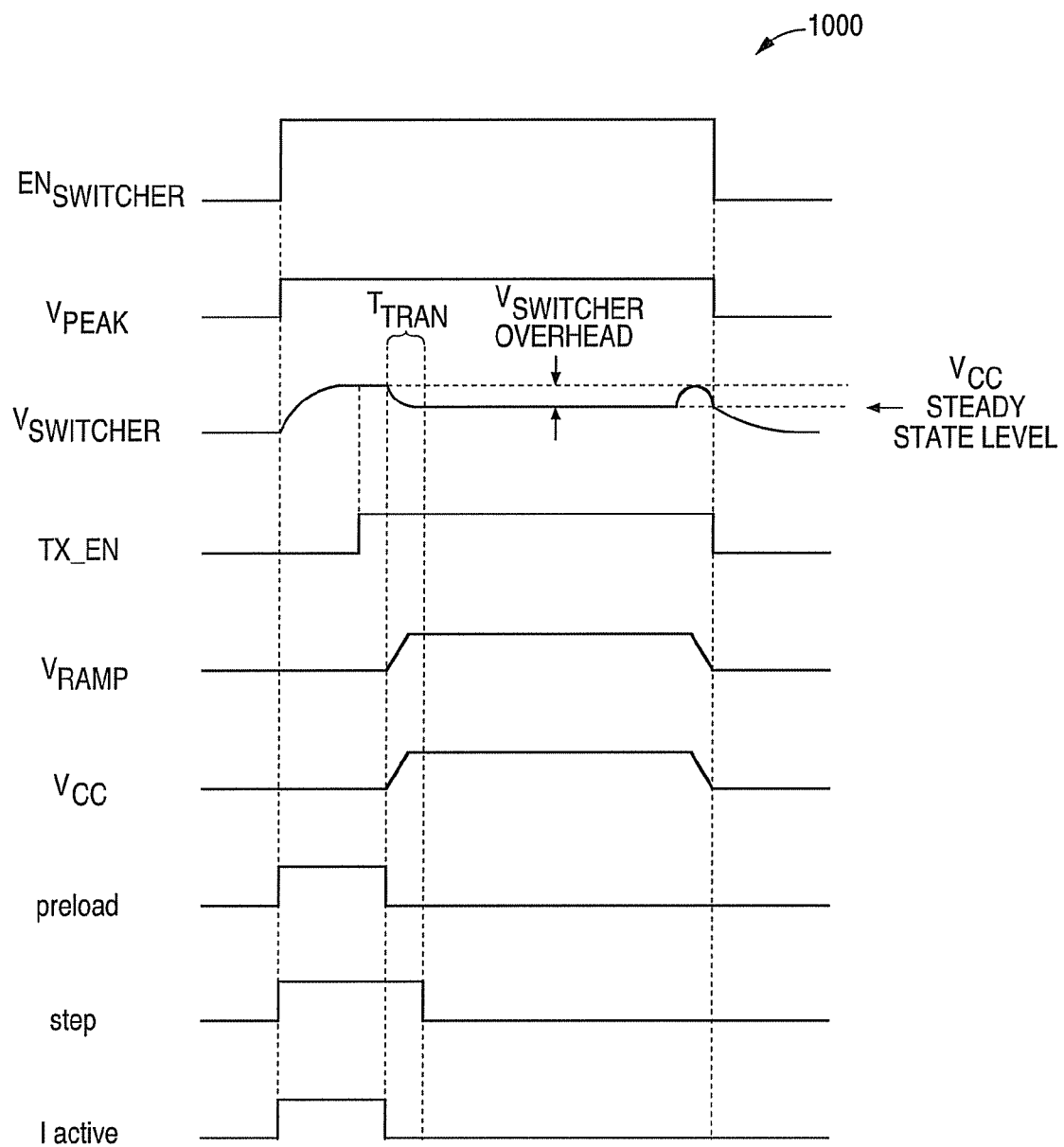
FIG. 10 illustrates timing waveforms that occur in the power supply control circuit and in the low drop out circuit that are shown in FIG. 8 and in FIG. 9.

FIG. 10 illustrates timing waveforms 1000 that occur in the power supply control circuit and in the low drop out circuit that are shown in FIG. 8 and in FIG. 9. As shown in FIG. 10, the $V_{SWITCHER}$ overhead voltage is equal to the $V_{SWITCHER}$ voltage minus the steady state level of the $V_{CC}$ voltage. The timing waveform that is designated Iactive represents the current through the preloaded active current source.

In the present invention the value of the $V_{SWITCHER}$ overhead voltage and the value of the active preload current Iactive may be related. For example, if the preload current is increased, then the magnitude of the transient dip may be decreased. This means that the magnitude of the $V_{SWITCHER}$ overhead voltage may also be decreased. If the value of the $V_{SWITCHER}$ overhead voltage is increased, then the output voltage $V_{CC}$ can tolerate a larger $V_{SWITCHER}$ dip in the load transient (or the output voltage $V_{CC}$ can tolerate a large load transient step). This means that the magnitude of the preload active current level may be reduced.

The balance between the magnitudes of the two values (i.e., the value of the $V_{SWITCHER}$ overhead voltage and the value of the active preload current) may be optimized through bench testing for each $V_{PEAK}/V_{RAMP}$ level. For example, the $V_{SWITCHER}$ overhead voltage may be selected so that it is proportional to the $V_{PEAK}$ value and the active preload current may be selected so that it is proportional to the $V_{PEAK}$ value as well. Both the value of the $V_{SWITCHER}$ overhead voltage and the value of the active preload current can be even more complex functions of the $V_{PEAK}$ value.

A simpler worst case scenario might also be possible. For example, the active current source level Iactive may be set equal to one half of the maximum power amplifier (PA) load current. Assume that the value of $V_{PEAK}$ is greater than one half of the maximum value of $V_{PEAK}$. Then the current source will be activated at a value of one half of the maximum value of the load current. Otherwise, the active current source would not be activated. After the value of the switcher load current transient dip has been determined, the $V_{SWITCHER}$ overhead voltage can be set to reflect the worst case load current transient dip with the active load current set to one half of the maximum value of the load current.

In the advantageous embodiment of the invention that is illustrated in FIGS. 6, 7, 8 and 9 the active current source is the low drop out (LDO) PMOS transistor M6. In alternative embodiments other devices may be used for the active current source. For example, an N-type metal oxide semiconductor (NMOS) transistor active load current may be controlled and used at the $V_{CC}$ output voltage node or at the $V_{SWITCHER}$ node.

The advantageous embodiment of the invention that is illustrated in FIGS. 6, 7, 8 and 9 comprises a buck/boost switcher circuit 800. It is understood that a buck only or a boost only switcher circuit may also be employed.

The principles of the present invention have been described for a device that operates with power amplifier (PA) modules in GSM (Global System for Mobile Communications) telecommunication devices. It is understood that the principles of the present invention are also applicable to power amplifier (PA) modules in WCDMA (Wideband Code Division Multiple Access) telecommunication devices. The present invention is not limited to one type of telecommunication device.

Figure 13:
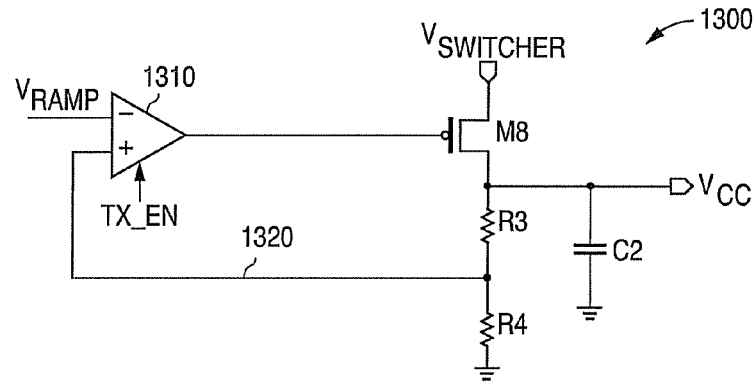
FIG. 13 illustrates a schematic diagram of a second embodiment of a low drop out (LDO) circuit in accordance with the principles of the present invention.

When the output voltage $V_{CC}$ is pulled down by the NMOS transistor M8 (in response to the preload signal on the gate of NMOS transistor M8), the $V_{CC}$ voltage level is set to its IR drop (e.g., one hundred millivolts (100 mV)). This may generate unwanted power from the power amplifier (PA) out. This potential undesired effect may be avoided by using the advantageous embodiment of the invention that is illustrated in FIGS. 11, 12 and 13.

Figure 11:
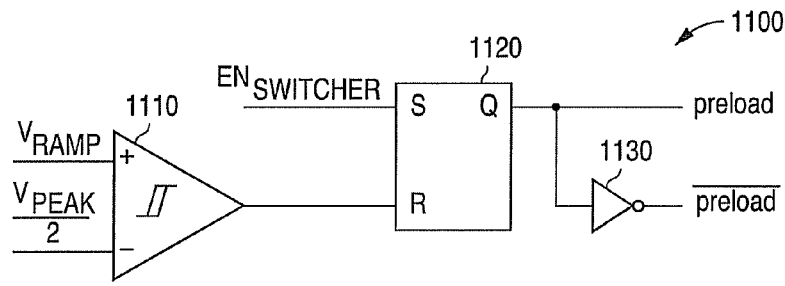
FIG. 11 illustrates a schematic diagram of an advantageous embodiment of a third control circuit that generates a preload control signal of the present invention.
Figure 12:
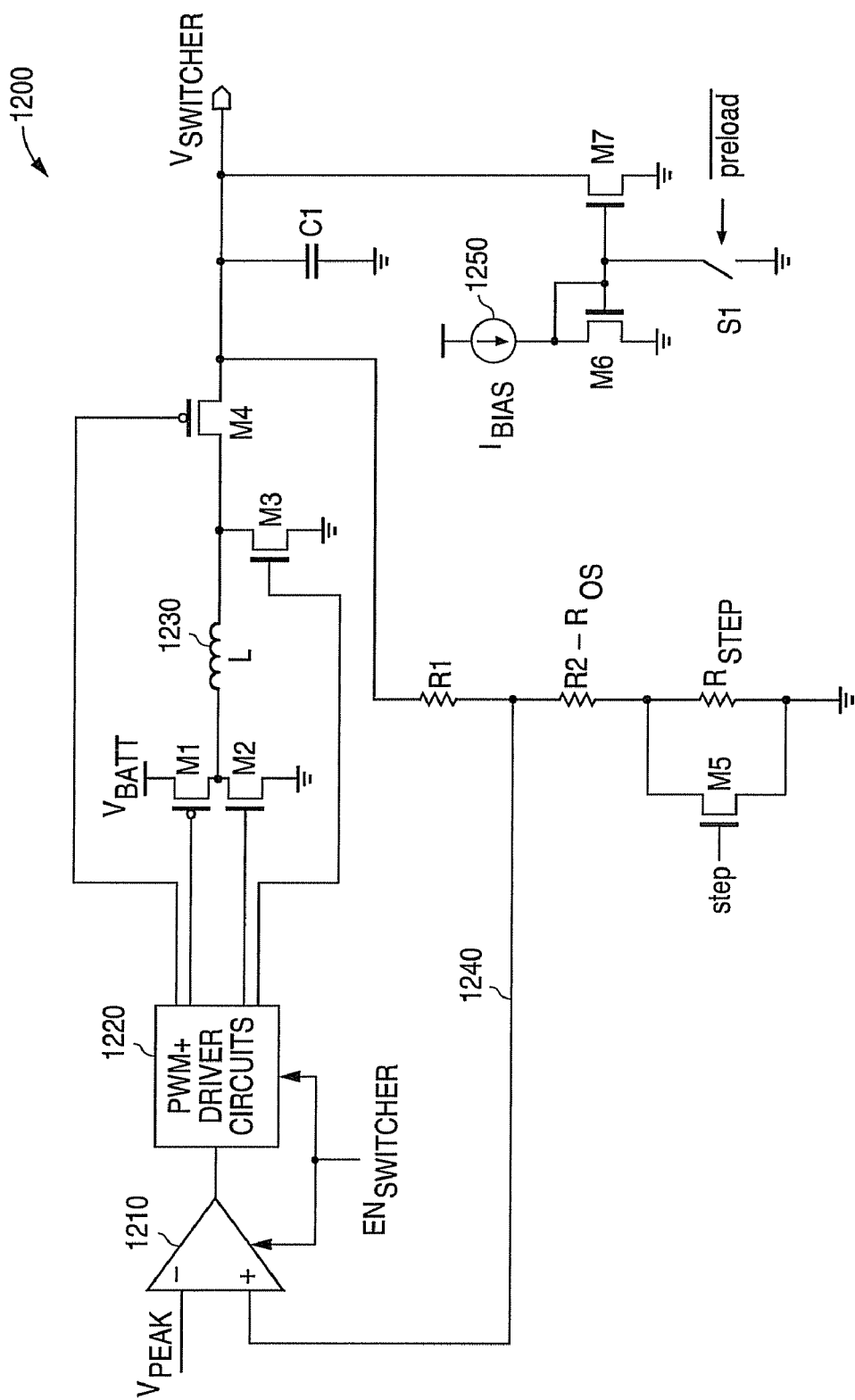
FIG. 12 illustrates a schematic diagram of a second embodiment of a switcher circuit in accordance with the principles of the present invention.

FIG. 11 illustrates an advantageous embodiment of a third control signal circuit 1100 that generates a preload control signal. The third control signal circuit 1100 comprises a comparator 1110, a Set-Reset (S-R) flip-flop 1120 and an inverter 1130. The non-inverting input of the comparator 1110 receives the $V_{RAMP}$ signal and the inverting input of the comparator 1110 receives a voltage signal that is equal to one half of the peak voltage $V_{PEAK}$. A typical value for the peak voltage $V_{PEAK}$ is one and six tenths volts (1.6 V). Therefore, a typical value for one half of the peak voltage is eight tenths of a volt (0.8 V). When the value of the $V_{RAMP}$ signal increases beyond one half of the peak voltage $V_{PEAK}$ then the output of the comparator 1110 sends a signal that resets the S-R flip-flop 1120.

As shown in FIG. 11, the S input of the S-R flip-flop 1120 is connected to the switcher enable signal $EN_{SWITCHER}$ and the output Q of the S-R flip-flop 1120 provides the preload signal. The preload signal is high when the switcher enable signal $EN_{SWITCHER}$ is high and remains high until the power amplifier (PA) load appears. The appearance of the power amplifier (PA) load is determined by the comparator 1110 comparing the $V_{RAMP}$ signal with one half of the peak voltage $V_{PEAK}$. The presence of the power amplifier (PA) load is assumed when the value of the $V_{RAMP}$ signal reaches one half of the peak voltage $V_{PEAK}$ which is about eight tenths of a volt (0.8 V). As previously mentioned, the comparator 1110 sends a signal that resets the S-R flip-flop 1120 so that the preload signal goes low when the $V_{RAMP}$ signal is greater than one half of the peak voltage V.

Lastly, the inverter circuit 1130 provides an inverted value of the preload signal (designated as the "preload bar" signal). The third control signal circuit 1100 operates in a manner that is similar to the first control signal circuit 600 except that the "trigger" for resetting the preload signal is equal to one half of the peak voltage $V_{PEAK}$.

FIG. 12 illustrates a schematic diagram of a second embodiment of a switcher circuit 1200 constructed in accordance with the principles of the present invention. FIG. 13 illustrates a schematic diagram of a second embodiment of a low drop out (LDO) circuit 1300 constructed in accordance with the principles of the present invention. The output of the switcher circuit 1200 is the voltage that appears at the output node that is designated $V_{SWITCHER}$. The $V_{SWITCHER}$ voltage is provided as an input to the low drop out (LDO) circuit 1300. The output of the low drop out (LDO) circuit 1300 is the voltage that appears at the output node that is designated $V_{CC}$. The output voltage $V_{CC}$ is provided to a power amplifier (PA) that is not shown in FIG. 13.

The switcher circuit 1200 comprises a buck-boost switcher circuit that comprises an error amplifier 1210, pulse width modulation (PWM) circuits and driver circuits 1220. The inverting input of the error amplifier 1210 receives the $V_{PEAK}$ voltage signal and the non-inverting input of the error amplifier 1210 receives a feedback voltage signal. The output of the error amplifier 1210 is provided as an input to the PWM and driver circuits 1220. As shown in FIG. 12, the enable switcher signal $EN_{SWITCHER}$ is provided to control the operation of the error amplifier 1210 and the PWM and driver circuits 1220.

A first output line from the PWM and driver circuits 1220 controls the operation of a first P-type metal oxide semiconductor (PMOS) transistor M1. A second output line from the PWM and driver circuits 1220 controls the operation of a first N-type metal oxide semiconductor (NMOS) transistor M2. A third output line from the PWM and driver circuits 1220 controls the operation of a second N-type metal oxide semiconductor (NMOS) transistor M3. A fourth output line from the PWM and driver circuits 1220 controls the operation of a second P-type metal oxide semiconductor (PMOS) transistor M4.

The PMOS transistor M1 and the NMOS transistor M2 are connected together as shown in FIG. 12 and are connected to a first end of inductor 1230. Power is supplied to the PMOS transistor M1 and to the NMOS transistor M2 by the battery voltage $V_{BATT}$. A typical value of battery voltage is three and six tenths volts (3.6 V). The NMOS transistor M3 and the PMOS transistor M4 are connected together as shown in FIG. 12 and are connected to a second end of inductor 1230.

A first end of a first feedback resistor R1 is connected to a node that is located between the PMOS transistor M4 and the $V_{SWITCHER}$ output node. A first end of an output capacitor C1 is connected to a node that is located between the first feedback resistor R1 node and the $V_{SWITCHER}$ output node. A second end of output capacitor C1 is connected to ground.

A second end of the first feedback resistor R1 is connected to a first end of a second feedback resistor that is designated R2-$R_{OS}$. A feedback line 1240 connects the node between the first feedback resistor R1 and the second feedback resistor R2-$R_{OS}$ with the non-inverting input of the error amplifier 1210.

A second end of the second feedback resistor R2-$R_{OS}$ is connected to a first end of a step resistor that is designated $R_{STEP}$. The second end of the step resistor $R_{STEP}$ is connected to ground. A third N-type metal oxide semiconductor (NMOS) transistor M5 is connected in parallel with the step resistor $R_{STEP}$. The gate of the NMOS transistor M5 is controlled by the step control signal.

A typical value of resistance for the first feedback resistor R1 is two hundred thousand ohms (200 kΩ). A typical value of resistance for a second feedback resistor R2 is one hundred thousand ohms (100 kΩ) and a typical value of resistance for an offset resistor ($R_{OS}$) is nine thousand ohms (9 kΩ). Therefore, a typical value of resistance for the second feedback resistor R2-$R_{OS}$ is ninety one thousand ohms (91 kΩ). A typical value of resistance for the step resistor $R_{STEP}$ is six thousand ohms (6 kΩ).

The presence of an offset resistor $R_{OS}$ reflects the necessity for elevating the $V_{SWITCHER}$ voltage above the $V_{CC}$ voltage in order to provide the $V_{SWITCHER}$ overhead voltage. This can be accomplished by reducing the magnitude of the resistance between node 1240 and ground. If the combined resistance (R2 plus $R_{STEP}$) would program the $V_{SWITCHER}$ voltage to be the same as the $V_{CC}$ voltage, then it is expected that replacing the R2 resistor with a resistance value of (R2 minus $R_{OS}$) will program the $V_{SWITCHER}$ voltage to be a voltage that is equal to ($V_{CC}$ voltage plus $V_{SWITCHER}$ overhead voltage). That is why a resistance value of R2–$R_{OS}$ is used between the node 1240 and the step resistor $R_{STEP}$ in FIG. 12.

As shown in FIG. 12, switcher circuit 1200 comprises a current source 1250 (designated $I_{BIAS}$ 1250). The current source 1250 is connected to ground through a fourth N-type metal oxide semiconductor (NMOS) transistor M6. The source and the gate of the NMOS transistor M6 is connected to the gate of a fifth N-type metal oxide semiconductor (NMOS) transistor M7. The source of the NMOS transistor M7 is connected to the $V_{SWITCHER}$ output voltage node.

A switch (designated S1) is located in a line that connects the gates of the NMOS transistors M6 and M7 to ground. The switch S1 is operated by the preload bar signal. That is, when the preload bar signal is high (and the preload signal is low), then the switch S1 will be closed.

As previously mentioned, FIG. 13 illustrates a schematic diagram of a second embodiment of a low drop out (LDO) circuit 1300 of the invention. Low drop out (LDO) circuit 1300 comprises an error amplifier 1310. The inverting input of the error amplifier 1310 receives the $V_{RAMP}$ voltage signal and the non-inverting input of the error amplifier 1310 receives a feedback voltage signal. The output of the error amplifier 1310 is provided as an input to the gate of a third P-type metal oxide semiconductor (PMOS) transistor M8. As shown in FIG. 13, the transmit enable signal TX_EN is provided to control the operation of the error amplifier 1310.

The source of PMOS transistor M8 is connected to the $V_{SWITCHER}$ voltage that is provided as an input to the low drop out (LDO) circuit 1300. The drain of the PMOS transistor M8 is connected to the output voltage node $V_{CC}$. The drain of the PMOS transistor M8 is also connected to a first end of a third feedback resistor R3. A first end of an output capacitor C2 is connected to the $V_{CC}$ output node. A second end of output capacitor C2 is connected to ground.

A second end of the third feedback resistor R3 is connected to a first end of a fourth feedback resistor that is designated R4. A feedback line 1320 connects the node between the third feedback resistor R3 and the fourth feedback resistor R4 with the non-inverting input of the error amplifier 1310.

In the advantageous embodiment of the invention that is illustrated in FIGS. 11, 12 and 13, the preloaded current source is achieved through the NMOS transistor M7 that is connected to the $V_{SWITCHER}$ output node of the switcher circuit 1200. In this advantageous embodiment the preloaded current source is not achieved through the PMOS transistor M8 in the low drop out (LDO) circuit 1300.

The preloaded current source that is provided by NMOS transistor M7 in switcher circuit 1200 is turned off after the transient time $T_{TRAN}$ has elapsed. As previously mentioned, unlike the first control signal circuit 600, the input for the comparator 1110 in the third control signal circuit 1100 is one half of the peak voltage instead of the threshold voltage $V_{TH}$. This is because the output voltage $V_{CC}$ is controlled by $V_{RAMP}$ in the low drop out (LDO) circuit 1300 and there is no current source interference as was the case in the low drop out (LDO) circuit 900.

Figure 14:
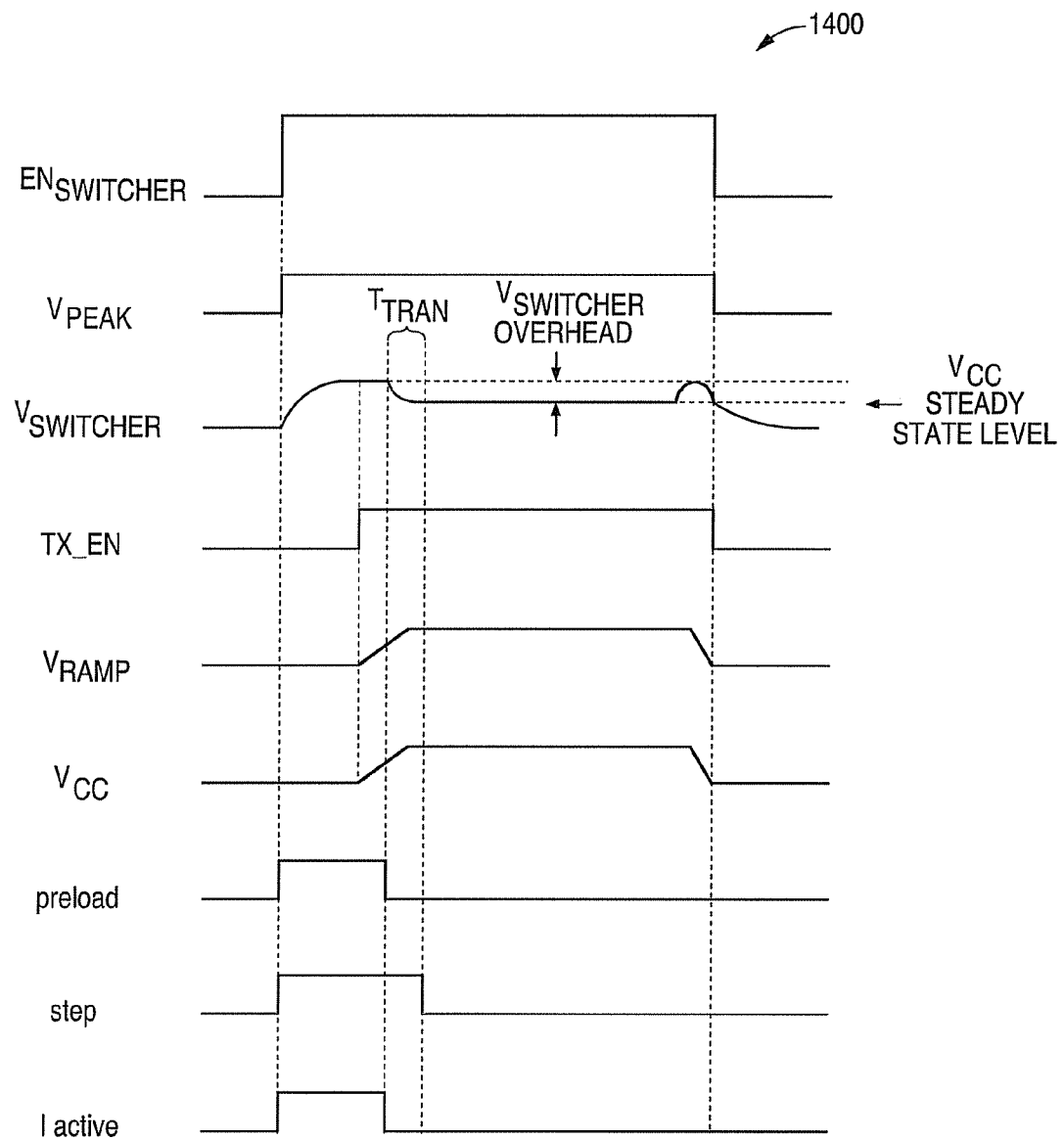
FIG. 14 illustrates timing waveforms that occur in the power supply control circuit and in the low drop out circuit that are shown in FIG. 12 and in FIG. 13.

FIG. 14 illustrates timing waveforms 1000 that occur in the power supply control circuit and in the low drop out circuit that are shown in FIG. 12 and in FIG. 13. As shown in FIG. 14, the $V_{SWITCHER}$ overhead voltage is equal to the $V_{SWITCHER}$ voltage minus the steady state level of the $V_{CC}$ voltage. The timing waveform that is designated Iactive represents the current through the preloaded active current source.

The $V_{RAMP}$ signal and the $V_{CC}$ signal shown in FIG. 14 begin to rise when the TX_EN signal goes high. The preload signal goes low when the $V_{RAMP}$ signal and the $V_{CC}$ signal have reached about one half of their maximum value. This is due to the threshold difference ($V_{TH}$ versus $V_{PEAK}/2$) of the error amplifier 1110. In comparison, the $V_{RAMP}$ signal and the $V_{CC}$ signal of the first embodiment of the invention (shown in FIG. 8) only begin to rise when the preload signal goes low.

Figure 15:
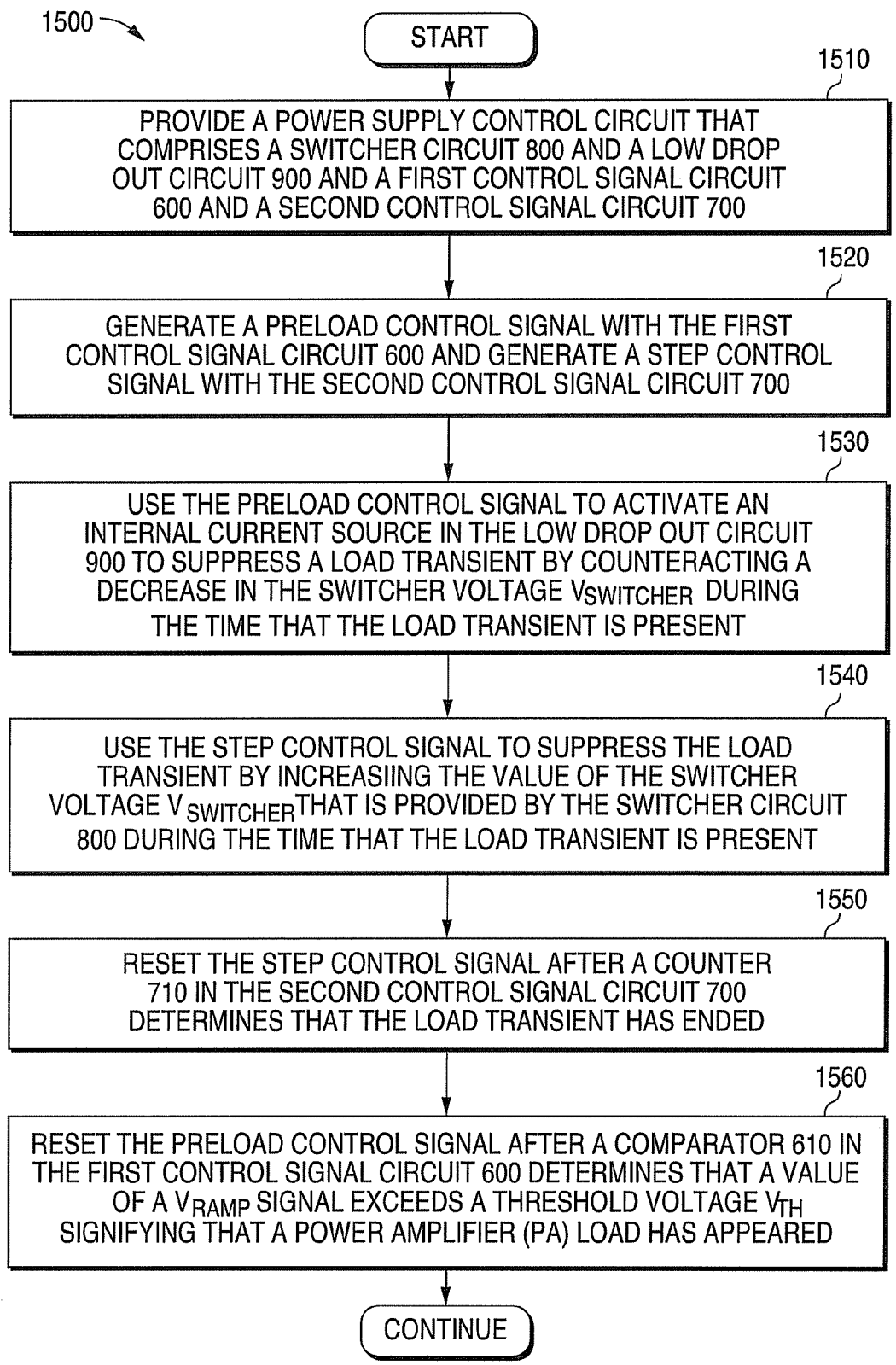
FIG. 15 illustrates a flow chart showing the steps of a first advantageous embodiment of the method of the present invention.

FIG. 15 illustrates a flow chart showing the steps 1500 of a first advantageous embodiment of the method of the present invention. In the first step of the method a power supply control circuit is provided that comprises a switcher circuit 800 and a low drop out circuit 900 and a first control signal circuit 600 and a second control signal circuit 700 (step 1510). Then a preload control signal is generated with the first control signal circuit 600 and a step control signal is generated with the second control signal circuit 700 (step 1520).

The preload control signal is used to activate an internal current source in the low drop out circuit 900 to suppress a load transient by counteracting a decrease in the switcher voltage $V_{SWITCHER}$ during the time that the load transient is present (step 1530). The step control signal is used to suppress the load transient by increasing the value of the switcher voltage $V_{SWITCHER}$ that is provided by the switcher circuit 800 during the time that the load transient is present (step 1540).

The step control signal is reset after a counter 710 in the second control signal circuit 700 determines that the load transient has ended (step 1550). The preload control signal is reset after a comparator 610 in the first control signal circuit 600 determines that a value of a $V_{RAMP}$ signal exceeds a threshold voltage V signifying that a power amplifier (PA) load has appeared (step 1560).

Figure 16:
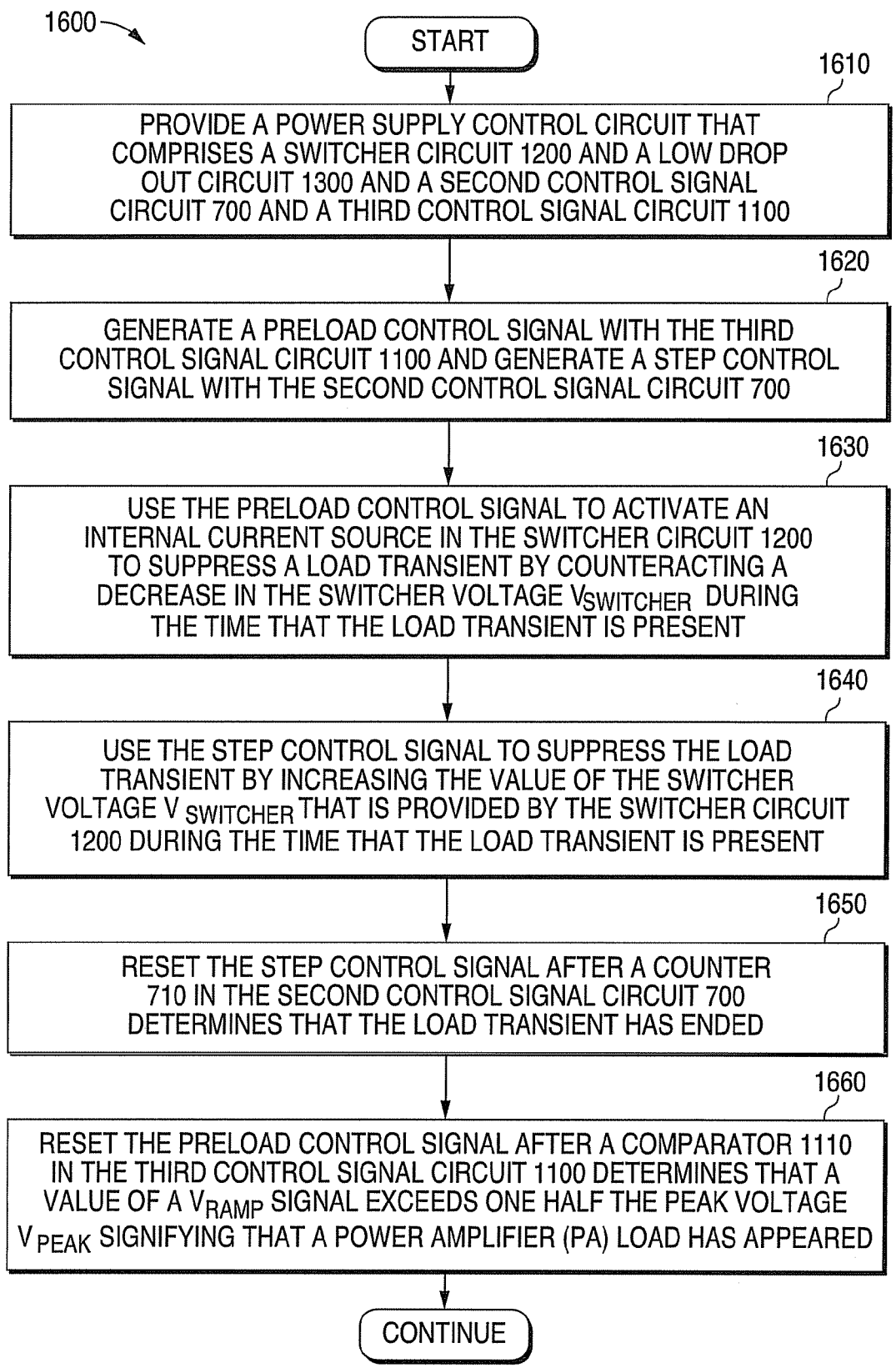
FIG. 16 illustrates a flow chart showing the steps of a second advantageous embodiment of the method of the present invention.

FIG. 16 illustrates a flow chart showing the steps 1600 of a second advantageous embodiment of the method of the present invention. In the first step of the method a power supply control circuit is provided that comprises a switcher circuit 1200 and a low drop out circuit 1300 and a second control signal circuit 700 and a third control signal circuit 11700 (step 1610). Then a preload control signal is generated with the third control signal circuit 1100 and a step control signal is generated with the second control signal circuit 700 (step 1620).

The preload control signal is used to activate an internal current source in the switcher circuit 1200 to suppress a load transient by counteracting a decrease in the switcher voltage $V_{SWITCHER}$ during the time that the load transient is present (step 1630). The step control signal is used to suppress the load transient by increasing the value of the switcher voltage $V_{SWITCHER}$ that is provided by the switcher circuit 1200 during the time that the load transient is present (step 1640).

The step control signal is reset after a counter 710 in the second control signal circuit 700 determines that the load transient has ended (step 1650). The preload control signal is reset after a comparator 1110 in the third control signal circuit 1100 determines that a value of a $V_{RAMP}$ signal exceeds one half the peak voltage $V_{PEAK}$ signifying that a power amplifier (PA) load has appeared (step 1660).

Although the present invention has been described with an exemplary embodiment, various changes and modifications may be suggested to one skilled in the art. It is intended that the present invention encompass such changes and modifications as fall within the scope of the appended claims.

What is claimed is:

1. A power supply control circuit comprising:
a low drop out circuit that comprises an operational amplifier having an output coupled to a low drop out transistor;
a switcher circuit having an output coupled to the low drop out circuit, the switcher circuit configured to provide a switcher operating voltage to the low drop out transistor; and
load transient suppression circuitry configured to suppress a load transient in the switcher operating voltage that is provided to the low drop out transistor, wherein the load transient suppression circuitry comprises:
a preload control signal circuit configured to generate a preload control signal;
an active current source responsive to the preload control signal;
a comparator configured to determine whether a specified load is present at the output of the low drop out circuit; and
a flip flop circuit configured to reset the preload control signal when the comparator determines that the specified load is present at the output of the low drop out circuit.

2. The power supply control circuit as set forth in claim 1, wherein the load transient suppression circuitry further comprises:
a step control signal circuit configured to generate a step control signal; and
a step transistor in a feedback resistor divider network that is responsive to the step control signal.

3. The power supply control circuit as set forth in claim 2, wherein the step transistor in the feedback resistor divider network is configured to be activated by the step control signal to increase the switcher operating voltage that is provided to the low drop out transistor when the load transient is present.

4. The power supply control circuit as set forth in claim 3, wherein the step transistor is coupled in parallel with a step resistor in the feedback resistor divider network.

5. The power supply control circuit as set forth in claim 3, wherein the step control signal circuit comprises:
a counter configured to determine whether the load transient has ended; and
a flip flop circuit configured to reset the step control signal when the counter determines that the load transient has ended.

6. The power supply control circuit as set forth in claim 2, wherein the feedback resistor divider network is located in the switcher circuit, and wherein the active current source is located in one of the switcher circuit and the low drop out circuit.

7. The power supply control circuit as set forth in claim 1, wherein the active current source is configured to be activated by the preload control signal to counteract a decrease in the switcher operating voltage when the load transient is present.

8. The power supply control circuit as set forth in claim 7, wherein the active current source comprises a current source having an output that is coupled to the low drop out transistor through a switch, the switch configured to be operated by the preload control signal.

9. The power supply control circuit as set forth in claim 1, wherein:
the comparator is configured to determine whether a power amplifier load is present at the output of the low drop out circuit; and
the flip flop circuit is configured to reset the preload control signal when the comparator determines that the power amplifier load is present at the output of the low drop out circuit.

10. The power supply control circuit as set forth in claim 9, wherein the comparator is configured to determine that the power amplifier load is present at the output of the low drop out circuit when a value of a ramp voltage signal exceeds a value of a threshold voltage.

11. A power supply control circuit comprising:
a low drop out circuit that comprises an operational amplifier having an output coupled to a low drop out transistor;
a switcher circuit having an output coupled to the low drop out circuit, the switcher circuit configured to provide a switcher operating voltage to the low drop out transistor; and
load transient suppression circuitry configured to suppress a load transient in the switcher operating voltage that is provided to the low drop out circuit, wherein the load transient suppression circuitry comprises:
a preload control signal circuit configured to generate a preload control signal;
an active current source responsive to the preload control signal;
a step control signal circuit configured to generate a step control signal; and
a step transistor in a feedback resistor divider network responsive to the step control signal.

12. The power supply control circuit as set forth in claim 11, wherein the active current source is configured to be activated by the preload control signal to counteract a decrease in the switcher operating voltage when the load transient is present.

13. The power supply control circuit as set forth in claim 12, wherein the active current source comprises a current source that has an output coupled to the low drop out transistor through a switch, the switch configured to be operated using the preload control signal.

14. The power supply control circuit as set forth in claim 11, wherein the preload control signal circuit comprises:
a comparator configured to determine whether a power amplifier load is present at the output of the low drop out circuit; and
a flip flop circuit configured to reset the preload control signal when the comparator determines that the power amplifier load is present at the output of the low drop out circuit.

15. The power supply control circuit as set forth in claim 14, wherein the comparator is configured to determine that the power amplifier load is present at the output of the low drop out circuit when a value of a ramp voltage signal exceeds a value of one half of a peak voltage.

16. The power supply control circuit as set forth in claim 11, wherein the feedback resistor divider network is located in the switcher circuit, and wherein the active current source is located in one of the switcher circuit and the low drop out circuit.

17. The power supply control circuit as set forth in claim 11, wherein the step control signal circuit comprises:
a counter configured to determine whether the load transient has ended; and
a flip flop circuit configured to reset the step control signal when the counter determines that the load transient has ended.

18. A method for operating a power supply control circuit, the method comprising the steps of:

operating a low drop out circuit that comprises an operational amplifier having an output coupled to a low drop out transistor;

providing a switcher operating voltage to the low drop out transistor using a switcher circuit; and suppressing a load transient in the switcher operating voltage that is provided to the low drop out transistor by:

generating a step control signal; and using the step control signal to activate a step transistor in a feedback resistor divider network to increase the switcher operating voltage that is provided by the switcher circuit when the load transient is present.

19. The method as set forth in claim 18, wherein the step of suppressing the load transient in the switcher operating voltage further comprises the steps of:

generating a preload control signal; and using the preload control signal to activate an active current source to counteract a decrease in the switcher operating voltage when the load transient is present.

20. The method as set forth in claim 19, wherein the feedback resistor divider network is located in the switcher circuit, and wherein the active current source is located in one of the switcher circuit and the low drop out circuit.

* * * * *